United States Patent Office 3,406,396
Patented Oct. 15, 1968

3,406,396
COHERENT PULSE-DOPPLER RADARS
Henri Jean Bosc, Paris, and Marc Jules Theodore Schneider and Gerard Marie Edouard van den Broek d'Obrenan, Versailles, France, assignors to International Standard Electric Corporation, New York, N.Y., a corporation of Delaware
Filed Nov. 25, 1966, Ser. No. 596,936
7 Claims. (Cl. 343—9)

ABSTRACT OF THE DISCLOSURE

The disclosure is drawn to a pulse Doppler radar system which produces an accurate indication of target velocity by optimizing the ratio of the peak signal power to mean noise power according to the matched filter theory. Quadrature sine wave outputs of a coherent oscillator and phase shifter are fed to two respective phase detectors each of which has a received signal input. The output of each phase detector is converted into a binary code and stored in two successive chains of memories. The output of each memory is converted back to an analog, and the analog produced from the corresponding memory in each chain is fed to a balanced modulator. The outputs of corresponding modulator pairs are then added and fed to triphase shifters. The output of the triphase shifters is then passed through a weighting matrix and a bank of amplifier-detectors. The maximum output of the amplifier-detectors is then produced by a selection circuit.

---

The present invention concerns circuits for extracting from signals received by a coherent pulse-Doppler radar, the information of distance and radial velocity corresponding to the reflecting object which gave rise to the said signals.

The two operations normally carried out by a Doppler type radar are the detection of reflecting objects and the extraction of certain related information from the received signal, the said information including, for instance, position of the reflecting object and its radial velocity. A coherent pulse-Doppler radar makes possible the determination of that information. The major problem to be solved in the receiver of such a radar is the detection of the signals in noise and thus to build a receiver having optimum characteristics. Among the proposed solution of the prior art, is the expedient of designing the receiver to optimize the ratio of the peak power of the signal to the average power of the noise. Several types of receivers exist which maximize the said ratio, and one of them makes use of a so-called "matched filter."

In a radar utilizing short coherent pulses, the signals received in response to one single transmission pulse are not sufficient for determining the presence, the position, and the radial velocity of a reflecting object. One is thus led to examine the signals received in response to several successive transmission pulses, and more particularly to examine the signals received during several repetition periods coming from a small zone (range increment) located at a given distance from the radar. The said signals coming from one same zone will be herein referred to as homologous samples. The "matched filter" is a device which makes it possible to take maximum advantage of the homologous samples by optimizing the ratio of the peak power of the signal to the average power of the noise.

One of the objects of the present invention is thus to provide circuits to achieve a "matched filter," this expression having the meaning defined hereabove.

Another object of the present invention is to provide a Doppler-type pulsed radar system adapted to exploit the "matched filter" theory in a novel manner.

The present invention will be particularly described with reference to the accompanying drawings, in which.

Figure 1:
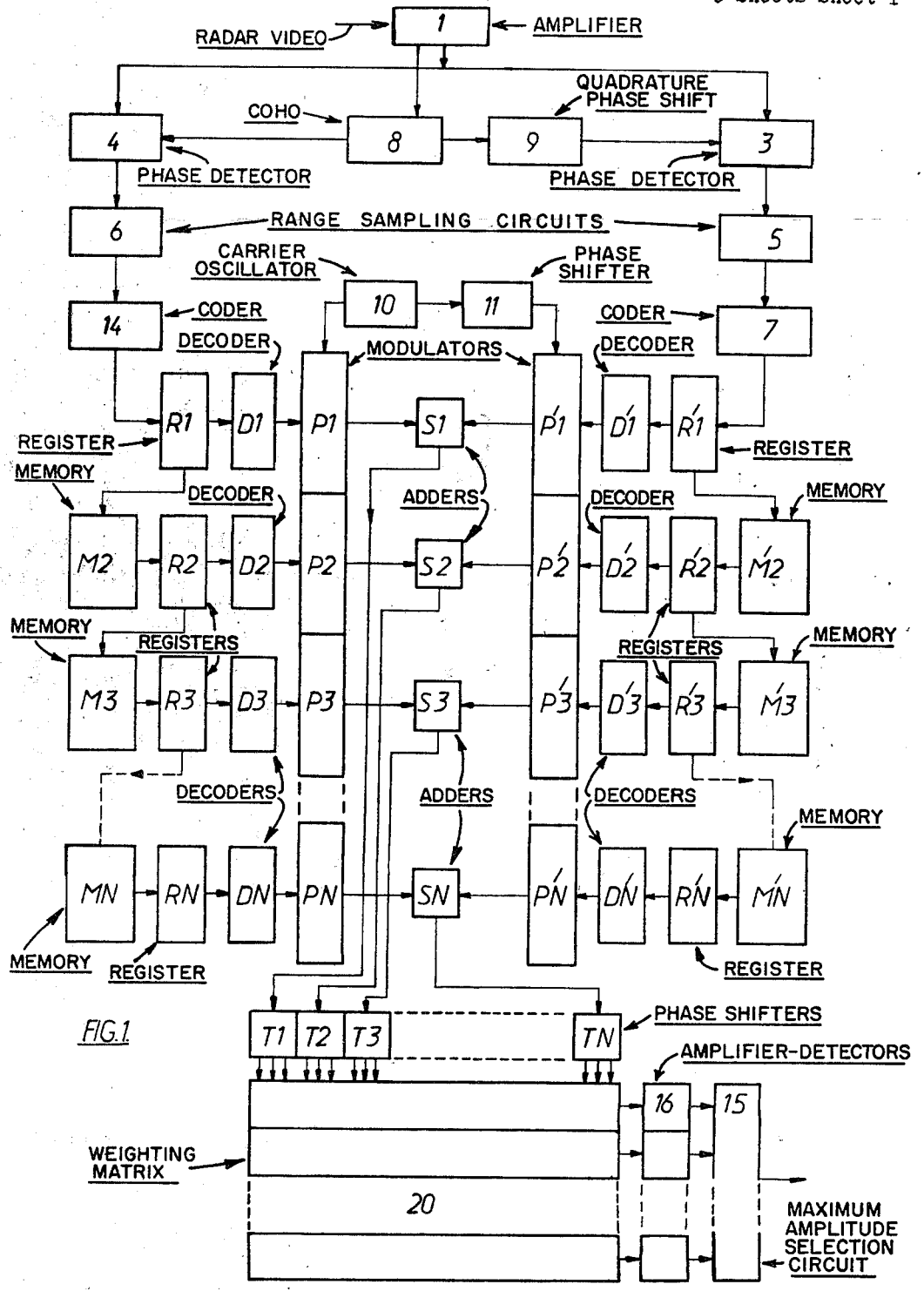
FIG. 1 represents an example of instrumentation of the system according to the present invention.

Referring now to FIG. 1, an operational diagram of a coherent pulse-Doppler radar receiver in accordance with the present invention will be explained.

Only the circuits making use of characteristics of the present invention have been shown in detail on FIG. 1. Circuits for receiving the signals coming out of the medium frequency amplifier 1 of a coherent pulse-Doppler radar are of a classical type, such as described in chapter 4 of Mr. Merrill I. Skolnik's book, "Introduction to Radar Systems," edited by McGraw-Hill Book Company in 1962.

Figure 2:
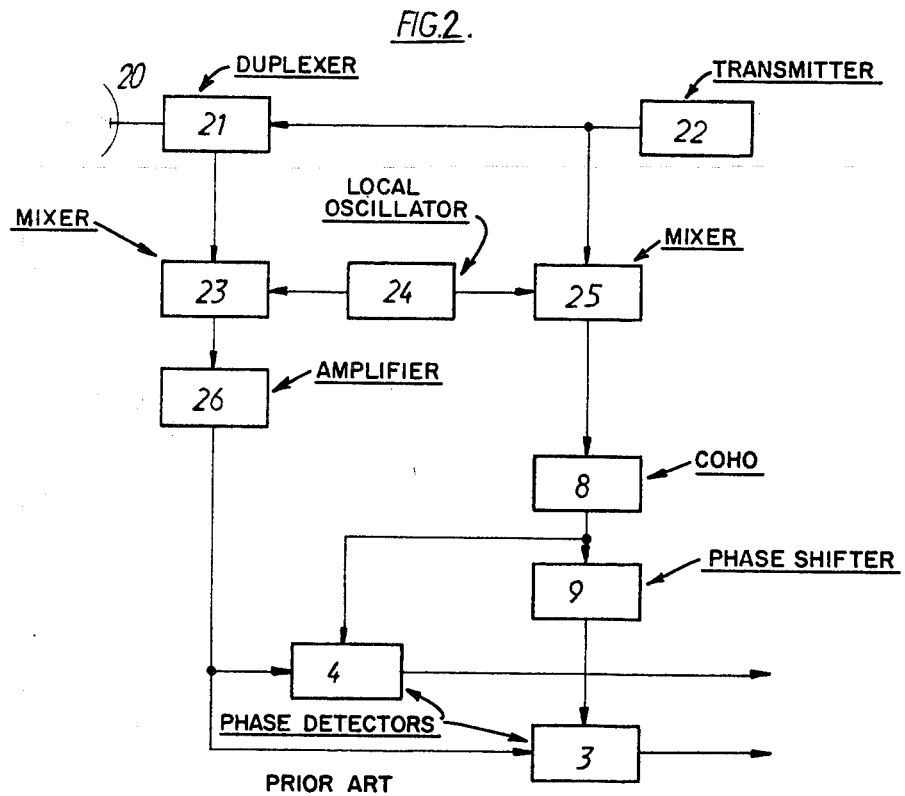
FIG. 2 represents a simplified operational block diagram of a coherent pulse-Doppler radar.

In order to facilitate the description, a classical type of a coherent pulse-Doppler radar of same type as the one described in the book quoted hereabove, has been shown in FIG. 2 and will be first briefly described. Such a radar comprises an antenna 20 of any known design for achieving the gain and beam characteristics used for transmission and reception, a transmitter 22 supplies high frequency pulses, the said pulses being transmitted to the antenna 22 which is common to the transmission and the reception through a high frequency switch 21 designated more commonly as a "duplexer" circuit. The signals received in response to transmitted pulses are switched by the switch 21 toward a mixer circuit 23 which receives the output signal of the said mixer circuit 23 and are applied to the intermediate frequency amplifier 26. The output signal of the local oscillator 24 is also applied to a second mixer 25 which also directly receives a fraction of the transmitted energy during the occurrence of the transmitted radar pulse (the high frequency signal supplied by the transmitter 22). The intermediate frequency pulse which comes out of the mixer circuit 25 is, at the beginning of each repetition period of the radar, used for starting the oscillator 8. The said oscillator 8, then supplies an intermediate frequency signal which has a fixed and predetermined phase relation with the phase of the transmitted pulse. At each repetition period this oscillator 8 is thus started in the way described hereabove, then stopped before the beginning of the following repetition period. This oscillator is often called a "coherent" oscillator.

The circuits referenced 8, 9, 3 and 4 of FIGS. 1 and 2 designate the same circuits viz. respectively, a coherent oscillator described previously a phase shift circuit, and two phase detector circuits.

It is known that if the high frequency signal transmitted is of the form sin $2\pi f_0 t$, where $f_0$ designates the frequency of the high frequency signal, the received signal corresponding to a moving reflecting object having a radial velocity $v_r$ with respect to the antenna and located at a distance $R_0$ from the antenna will have the form:

$$\sin\left[2\pi(f_0 \pm f_d)t - \frac{4\pi f_0 R_0}{c}\right] = \sin\left[2\pi(f_0 \pm f_d)t - \phi_0\right]$$

in which $f_d$ designates the Doppler frequency $$f_d = \frac{2v_r}{c}$$

and $c$ is the velocity of light. The signs + or − indicate a reflecting object having a radial velocity which comes toward or moves away from the antenna. At the output of the intermediate frequency amplifier 1 (FIGS. 1 and 2) the signal has the following form: $\sin[2\pi(f_m \pm f_d)t - \phi_0]$ where $f_m$ designates the center frequency of the intermediate frequency amplifier. At the output of the phase detector 4, the signal is:

(1) $A \sin(\pm 2\pi f_d t - \phi_0)$ if the coherent oscillator 8 supplies a signal $\sin 2\pi f_m t$. On the other hand, the signal coming out of the phase detector 3 is:

(2) $A \sin\left(\pm 2\pi f_d t - \phi_o + \dfrac{\pi}{2}\right) = A \cos(\pm 2\pi f_d t - \phi_o)$ since the phase shifted reference signal supplied by the phase shift circuit 9 is:

$$A \sin\left(2\pi f_m t + \dfrac{\pi}{2}\right) = \cos 2\pi f_m t$$

The phase detector circuits 3 and 4 thus supply the two quadrative components of the signal at the Doppler frequency $f_d$. The information contained in these two components makes determination of the sense of radial movement of the moving echo possible, i.e., whether the moving target which has generated this Doppler signal comes toward or moves away from the radar.

In the continuation of the present description with particular reference to FIG. 1, sin $\varphi$ and cos $\varphi$ will designate the signals coming out of the phase detectors 4 and 3 for sake of simplification, and by analogy with the expressions (1) and (2) above.

The two signals cos $\varphi$ and sin $\varphi$ are sampled simultaneously in the sampling circuits 5 and 6, so that the two signals which appear at the output of the circuits 5 and 6 correspond to a distance zone (range increment) located at a given distance from the radar. In the particular example described, the samples may be assumed to have a duration $\tau$ of two microseconds, this corresponding to a distance zone having a radial dimension of three hundred meters. The samples are in juxtaposition as nearly as practicable and the two signals cos $\varphi$ and sin $\varphi$ are sampled out in sections of two microseconds. These successive samples are coded afterwards, either in a coder 7 for the samples of the signal cos $\varphi$ or in a coder 14 for the samples of the signal sin $\varphi$.

These coding circuits 7 and 14 supply for each sample defined hereabove a binary number of $p$ digits which characterizes the amplitude of the sample. When the sample corresponding to the signal cos $\varphi$ is coded, its code is stored in a register R'1 having $p$ positions where it is available during a maximum duration of two microseconds. The same goes for the sample sin $\varphi$ the code of which is stored in the register R1. This binary code which is characteristic of the sample of the signal cos $\varphi$ follows then two paths. On the one hand it is decoded in a decoding circuit D'1, and on the other hand it is stored in a memory M'2. This memory M'2 is for example a ferrite core memory comprising $p$ memory planes, each plane being assigned to a determined binary digit; the number of cores included in a memory plane is equal to the number of samples (or range increments) which may be sampled during a repetition period of the transmitted radar pulses. If T is the duration of a repetition period, this duration being assumed constant, by taking a number of cores per memory plane equal to $T/\tau$ it will be possible to register all the signals received during a repetition period; thus, if a repetition period has a duration T equal to five hundred microseconds, each memory plane will have two hundred and fifty cores. The codes of the different samples of the signals received in response to a transmitted radar pulse, which will be called the first pulse of a cycle of N successive pulses of the transmitter, are stored successively in the register R'1 then in the memory M'2. When the code of the first sample of the signal received in response to the second radar pulse of the cycle is stored in the register R'1 the cores of the memory M'2 which have stored the code of the first sample of the first repetition period are read and the $p$ digits of the said code are stored in the register R'2; one has thus simultaneously in the registers R'1 and R'2 the codes of two samples corresponding to one same distance zone. All of the said samples coming from one same zone are called homologous samples. When the code of the second sample corresponding to the second pulse of the cycle is stored in the register R'1, the code of the homologous sample corresponding to the first pulse is stored in the register R'2 whereas, on the contrary, the codes previously stored in the registers R'1 and R'2 are stored respectively in the memories M'2 and M'3. It is thus seen that at the end of this second repetition period of the cycle of N periods the signals corresponding to the first repetition period are stored in the memory M'3 whereas the signals received in the course of the second repetition period are stored in the memory M'2. Thus, after $(N-1)$ repetition periods, the signals received during the first repetition period are stored in the memory M'N.

It is understood that in the course of the Nth repetition period, the N registers R'1 and R'N will store successively the codes of the homologous samples corresponding to the cycle of N repetition periods. At a given instant, the codes stored in the registers R'1 to R'N thus give the history of a certain zone located at a given distance from the radar.

The coded samples of the other components sin $\varphi$ of the Doppler signals received during a repetition period are transferred in the same way from one memory to the following one and, during the Nth repetition period, the codes which are stored at a given moment in the registers R1 to RN give also the history of a certain zone. But the different operations carried out over the signal sin $\varphi$ and over the signal cos $\varphi$ are made in synchronism, so that the codes of the samples which are stored during a certain time in the registers R1 to RN on the one hand, and R'1 to R'N on the other hand concern signals coming from one same zone in the course of N soundings. The different signals required for this synchronization are supplied by a central clock which is not shown on FIGURE 1.

The selection circuits for the writing and the reading of the information contained in the memory cores M2 to MN and M'2 to M'N are common to all the memories, since the homologous cores of each memory are selected simultaneously, the said homologous cores corresponding to the homologous sample of the successive repetition periods. However, the method of operation of the memories described hereabove is based on the assumption that the writing and reading operations are simultaneous, since when the homologous samples stored in the registers are written in the memory, they must be replaced immediately by the following homologous samples. Since simultaneity of these two operations is impossible in a single ferrite core memory, a solution consists in splitting each memory M2 to MN and M'2 to M'N into two groups, one for the odd order samples and the other for the even order samples. Assuming that the samples of any particular repetition period have been effected in the order 1, 2, 3 ... $T/\tau$ according to their chronological order of arrival during the repetition period, the homologous samples of the different repetition periods are obviously arranged in the same order. Furthermore, for each group there is an associated register in which is written successively either the odd order samples for the register corresponding to an odd group, or the even order samples for the register corresponding to an even group. The odd and even groups and the registers associated constitute two odd and even sets, having selection circuits independent although identical and synchronized in such a way that the even order samples for instance are stored in the even registers, while the preceding samples of odd order stored in the odd registers are used in the way which will be described further on.

In the continuation of the present description, this duplication of the memories and of the registers will not be taken into account for the sake of clarity of description.

The binary numbers stored in the register R1 to RN which correspond to the signal $\sin \varphi$ are transformed into analog voltages in the decoding circuits D1 to DN and the output voltages of these decoders constitute amplitude modulated signals of the form $\sin 2\pi ft - \sin \omega t$. The frequency $f$ of these outputs is very much higher than the maximum Doppler frequency to be detected, reaching about one hundred times this maximum frequency.

The modulation process producing the said output signals is carried out in N modulating circuits, referenced P1 to PN, each one receiving an unmodulated carrier signal $\sin \omega t$ from an oscillator 10. The binary numbers stored in the registers R'1 to R'N, which correspond to the signal $\cos \varphi$ are decoded in decoding circuits D'1 to D'N and the output analog voltages of the said decoders modulate (in circuits P'1 to P'N) an additional carrier signal of the form $\cos \omega t$ obtained by phase shifting the signal $\sin \omega t$ supplied by the oscillator 10 by a value $\pi/2$, in a circuit 11. At a given instant $t$, of the Nth repetition period, the codes of the homologous samples which are stored in the different registers correspond, as it has been seen previously, to one particular zone or range increment located at a given distance, for instance $R_o$, from the radar. If a reflecting object having a radial velocity $v_r$ exists in this zone, the signal coming out of the decoding circuit DN will have the expression given by the Formula 1, viz: $d_1 = A \sin(\omega_d t - \phi_o)$, which is the signal which has been received at the instant $t$ of the first repetition period. The signal coming out at the same instant from the decoder DN−1, not shown on the figure, will be: $d_2 = A \sin[\omega_d(t+T) - \phi_o]$, i.e. the same signal as the one coming out of the decoder DN, but phase shifted by a value $\omega_d T = \varphi_d$, T being the duration of the repetition period. The signal coming out of the decoder D1 will be:

$$d_N = A \sin[\omega_d[t + (N-1)T] - \phi_o]$$

viz. a phase shifting:

$$\omega_d (N-1) T = (N-1) \varphi_d$$

with respect to the signal $d_1$.

These signals $d_1$ to $d_N$ modulate a signal of the form $\sin \omega t$ in modulators PN to P1, these modulators being assumed balanced. The signal coming out of the modulator PN will be:

$p_1 = A \sin(\omega_d t - \phi_o) \sin \omega t$ and the signal coming out of the modulator P1 will be:

$$P_N = A \sin[\omega_d t - (N-1)\varphi_d - \phi_o] \sin \omega t$$

The same goes for the signals $d'_1 = A \cos(\omega_d t - \phi_o)$ to $d'_N = A \cos[\omega_d[t + (N-1)T] - \phi_o]$ coming out of the decoders D'N to D'1 which modulate a signal $\cos \omega t$, so that the signals coming out of the balanced modulators P'N and P'1 will be given respectively by the following expressions:

$$p'_1 = A \cos(\omega_d t - \phi_o) \cos \omega t$$

and $$p_N = A \cos[\omega_d t - (N-1)\varphi_d - \phi_o] \cos \omega$$

It is clear that the signals coming out of the balanced modulators are pulses having a duration of approximately two microseconds, and amplitude given by $A \sin(\omega_d t - \phi_o)$ and $A \cos(\omega_d t - \phi_o)$ for the signals coming respectively from the decoders $D_N$ and $D'_N$. The instant $t$ is assumed to be taken in the middle of the two microseconds pulse. These pulses thus present several sine waves of frequency $f$.

The modulated signals coming out of the modulators PN and P'N (for instance) are summed up in a circuit SN the output signal of which is given by $$s_1 = A \cos[(\omega - \omega_d)t + \phi_o]$$

The signal coming out of the circuit S1 is $$s_N = A \cos[(\omega - \omega_d)t - (N-1)\varphi_d + \phi_o]$$

Figure 3:
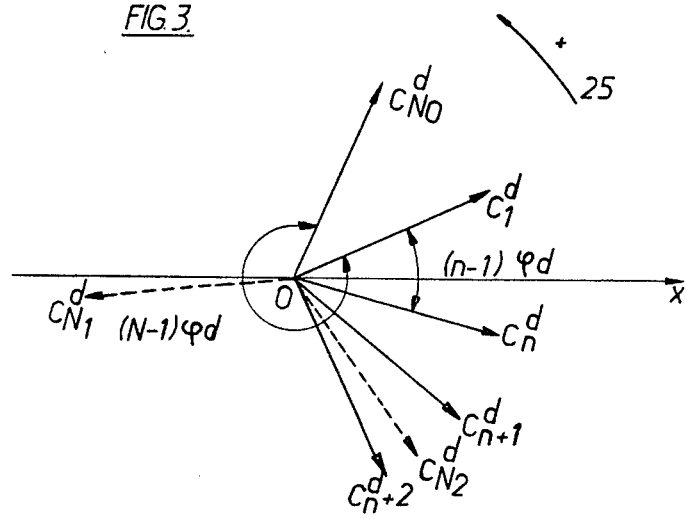
FIG. 3 represents a vectorial diagram for illustrating significant system phase relationships.

This signal $s_1$ may be represented in a vector diagram, as shown on FIGURE 3, by the projection with respect to a fixed axis Ox of a vector $C_1^d$ of modulus A rotating at an angular speed $(\omega - \omega_d)$ and making at the instant $t$, the angle $(\omega - \omega_d)t + \phi_o$ with the axis Ox. On this FIGURE 3, the vector $C_{No}^d$, which makes an angle $-(N-1)\varphi_d$ with the vector $C_1^d$, has a projection over the axis Ox representing the signal $s_N$. The arrow 25 bearing the sign + indicates the positive direction adopted for the rotating direction. Also in FIGURE 3, the vectors $C_n^d$, $C_{n+1}^d$, $C_{n+2}^d$ correspond to the signals received at the instant $t$ of the $n$th, $(n+1)$th, $(n+2)$th repetition periods of the cycle. These vectors are phase shifted one with respect to the other by a value $-\varphi_d$.

It will be observed that the formulae written hereabove correspond to a reflecting object approaching the radar, i.e. the sign + has been taken in the Formulae 1 and 2. For a reflecting object moving away from the radar, the negative sign (−) is taken, thus giving an output signal from the circuit S1 of the form:

$$A \cos[(\omega + \omega_d)t + (N-1)\varphi_d + \phi_o]$$

On FIGURE 3, these N signals would have been represented by vectors rotating at the angular speed $$(\omega + \omega_d)$$

the phase shifting of which (between two successive vectors) would be positive, whereas it is negative in the example described in relation with FIGURE 3.

Having available the N samples $s_1$ to $s_N$ of a particular Doppler signal, it is desired to carry out their summation by optimizing the ratio of the peak power of the signal to the average power of the noise. According to the theory of the matched filter, a report of which may be found in Chapter 9 of the book quoted at the beginning of the present description (this optimization is obtained by an amplitude response which is a "mirror image" of that of the signal received. The law of the phase variation of the Doppler signal corresponding to a particular Doppler frequency $f_d$ has been discussed previously. A reverse phase position consists thus in phase shifting the vector $C_n^d$ by an angle $+(n-1)\varphi_d$, if the vector $C_1^d$ is taken as reference, i.e. in aligning the vector $C_n^d$ on the vector $C_1^d$.

Figure 4:
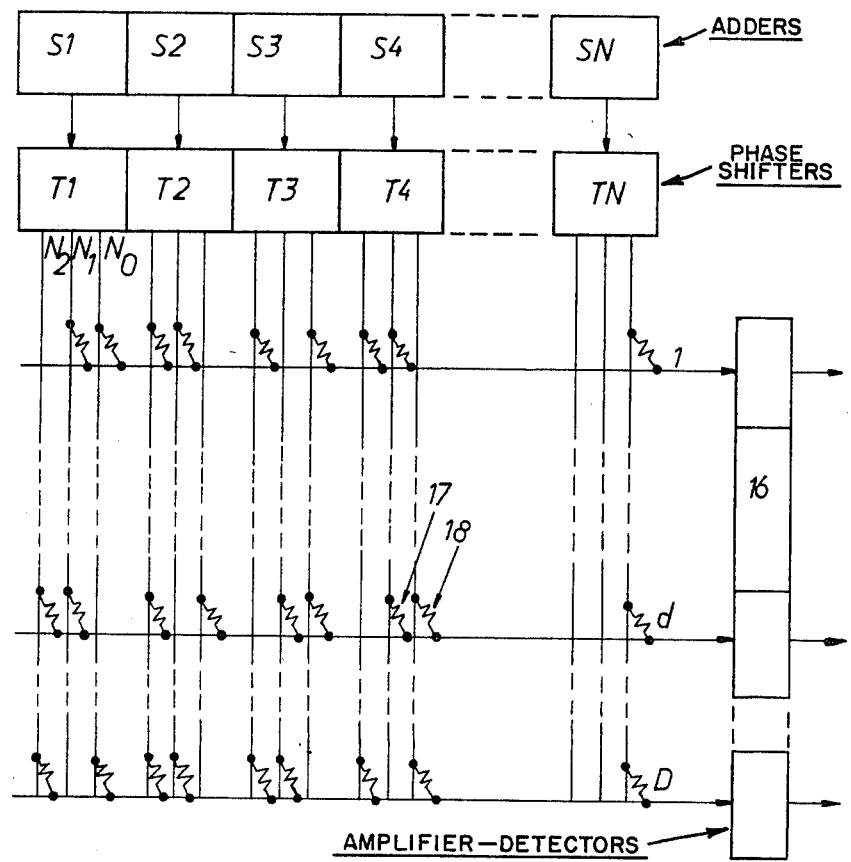
FIG. 4 represents an example of instrumentation of a filtering matrix.

In order to determine the desired form of amplitude weighting, it is sufficient to know the form of the signal received. But the form of the signal received may be calculated by observing that in the course of a passage of the antenna beam over a reflecting object, this latter will receive a certain number of substantially equal transmitted pulses. The reflected signals received by the receiver will not have the same amplitude; however, these signals being maximum when the beam axis is centered about the object and less on either side of center. In the example described, this amplitude response has been taken as a Gauss curve, the different values of which will be N in number and will be referenced $gl \ldots gn \ldots gN$, this index corresponding to the repetition period considered in the course of the cycle with N pulses. The means used for achieving this amplitude weighting will now be described in relation to FIGURES 1 and 4.

In order to achieve the different phase shiftings of the signals $s_2$ to $s_N$ and to obtain the alignment of the $N-1$ vectors $C_n^d$ with the reference vector $C_1^d$, one associates first to each signal $s_N$, for instance, two signals which are out of phase by $2\pi/3$ and $4\pi/3$ with respect to the said signal. These three signals, taken as a group, constitute a three-phase system, and subsequently weighting is carried out on two of the three signals of this system. The said three-phase system is actually obtained by means of a set of N identical triphase circuits T1 to TN receiving respectively the output signals $s_N$ to $s_1$ of the circuits S1 to SN.

The three signals which appear simultaneously on the three outputs N0, N1, N2 (FIGURE 4) of the circuit T1 have the following expressions:

$$t_{N0} \; A \cos [(\omega-\omega_d)t-(N-1)\varphi_d]$$

$$t_{N1} \; A \cos \left[(\omega-\omega_d)t-(N-1)\varphi_d+\frac{2\pi}{3}\right]$$

$$t_{N2} \; A \cos \left[(\omega-\omega_d)t-(N-1)\varphi_d+\frac{4\pi}{3}\right]$$

In these expressions, the phase shifting $\phi_o$ has not been taken into account, since it is identical for the signals reaching the radar from a given distance.

On the FIGURE 3, the three vectors which represent symbolically the three-phase system defined by the above mentioned expressions are referenced $C_{N0}^d$, $C_{N1}^d$, $C_{N2}^d$, the last two vectors being deducted from the first one by rotation of angular value $2\pi/3$ and $4\pi/3$.

In order to phase shift the signals $s_N$ by an angle $+(N-1)\varphi_d$, it is sufficient to carry out a weighting over two of the components of the three-phase system.

The two components which are to be weighted will be those which are on both sides of the representative vector of the reference signal $C_1^d$; on FIGURE 3 it is seen that these two components will be $C_{N0}^d$ and $C_{N2}^d$.

The weighting coefficients $K_{N0}^d$ and $K_{N2}^d$ to be applied to these components will then be determined by the identity:

$$A \cos (\omega-\omega_d)t=K_{N0}^d t_{N0}+K_{N2}^d t_{N2}$$

For a particular Doppler frequency $f_d$, $(N-1)$ identities of this kind must be solved (the reference signal $s_1$ not being weighted, i.e. having coefficients $K_1^d$ equal to 1), this determining $2(N-1)$ weighting coefficients $K^d$.

For another Doppler frequency $f_{d1}$, i.e. for another radial velocity $v_{r1}$, $2(N-1)$ coefficients $K^{d1}$ will be calculated in the same way. In order to cover a certain range of Doppler frequencies, a certain number D of Doppler frequencies $f_d$ must be chosen; this number D is determined in accordance with the range of Doppler frequencies to be covered, as well as with the width of the spectrum due to the passage of the antenna beam over a fixed reflecting object, the said spectrum depending upon the rotating speed of the antenna.

The number of coefficients K to be calculated is thus $D \times 2(N-1)$. It will be noted that this range of Doppler frequencies must cover the Doppler frequencies called "positive and negative," i.e. frequencies corresponding to objects coming close or moving away from the radar.

To these weighting coefficients K which enable to obtain the different phase shiftings, one may associate the coefficients $g$ which take into account the amplitude responses curves, i.e. the weighting carried out on the output signals of the circuit T1 for instance for a certain Doppler frequency $f_d$, will be proportional to the coefficients: $K'_{N0}=g_N K_{N0}^d$ and $K'_{N2}=g_N K_{N2}^d$. At the outputs of the circuit TN, the multiplying coefficient will be $g_1$ since $K_1^d$ is taken equal to 1. Besides, it will be observed that one single output of the circuit TN, the one giving the signal which is not out of phase $t_{10}$, is used, and thus that the phase circuit TN is not required; however, this circuit will be kept in the continuation of the present description.

These different weightings are obtained through a filtering matrix circuit 20 receiving the N three-phase signals supplied by the circuits T1 to TN, the said circuit 20 presenting D outputs, each output corresponding to a different Doppler frequency.

This circuit 20 is represented in detail on FIGURE 3. Each phase shift circuit T1 to TN presents three output conductors, these N groups of three conductors constitute the columns of a matrix known as filtering matrix, the lines of which, D in number, are connected to two conductors of each column by resistances such as those referenced 17 and 18, between the triple column of the circuit S4 and the line $d$ corresponding to the Doppler frequency $f_d$. The values of these resistances are chosen in accordance with the weighting coefficients K', the said values being in reverse proportion with the coefficients K'. The voltages which appear over the column conductors of the matrix may be considered as supplied by variable voltage generators, and the currents which flow through the resistances of the matrix are proportional to these voltages and to the coefficients K', these difference currents are summed up in a resistance connected at the input of an amplifier followed by a detector, the whole being represented by the circuit 16. This resistance and this amplifier are designed in such a way as the voltage which appears at the terminals of the said resistance has no effect at all over the values of the currents which flow through the resistances of the matrix.

At a given moment, the N three-phase signals which are applied to the circuit 20 correspond to a zone located at a given distance from the radar, these signals are weighted by the different resistances of the matrix, and the line which will show the signal having the biggest amplitude will be that for which the ratio of the signal peak power to the average power of the noise is the highest, i.e. the line for which the phase shiftings obtained by the weighting coefficients K correspond to the phase variations of the Doppler signal due to the object located in the explored zone. It will be observed that for a zone in which is located a reflecting object of radial velocity $v_r$ and thus of a Doppler frequency $f_d$ corresponding to one line of the filtering matrix 20 the signal which will appear on the said line will be maximum when the N homologous samples of the zone will be centered over the object and will receive thus an optimum weighting $g$. If D is the number of lines of the matrix, the D signals amplified and detected in the circuit 16 are further on compared in a device known as "majority device" 15 which gives way only to the signal having the highest value, this said circuit 15 (FIGURE 1) marking also the number of the line from which the said signal is issued.

In the particular example described, it has been assumed that the repetition period T of the transmitted radar pulses was constant, although it is clear that the circuits, object of the present invention, apply also to coherent pulse-Doppler radars, the repetition period of which is not constant.

While the principles of the above invention have been described in connection with specific embodiments and particular modifications thereof, it is to be clearly understood that this description is made by way of example and not as a limitation of the scope of the invention.

What is claimed is:

1. A pulse Doppler radar system which includes transmitting means for radiating radar pulses, means for receiving echo signals of said radar pulses reflected by distant objects, a coherent oscillator for establishing a phase reference representative of the phase of energy in said radar pulses, and means responsive to said coherent oscillator for providing a first set of video signals having instantaneous amplitudes which are a function of the instantaneous phase difference of energy within said received echo signals as compared to the phase of energy in said transmitted radar pulses, comprising the combination of: means for developing a second set of video signals having instantaneous amplitudes which are a function of the instantaneous phase difference of energy within said received echo signals as compared to the phase of energy in said transmitted pulses shifted $\pi/2$ radians in phase; first and second sampling and encoding means for sampling said first and second video signals respectively in successive range increments over at least a portion of the time between successive ones of said radar pulses, and for digitally including said samples discreetly for each of said range increments in each of said sets of video signals, thereby to produce first and second series of digital codes; first and second storage means each capable of storing the said codes for the total number of said range increments of interest between a successive two of said radar pulses; means for storing said first and second series of digital codes in said first and second storage means respectively, the first of said codes in each of said series being first installed in a first memory position in the corresponding storage means and thereafter moved to successive memory positions as succeeding codes are installed in said memory seriatim; first and second carrier sources of the same frequency but phase shifted $\pi/2$ radians with respect to each other; first and second digital-to-analog conversion means responsive respectively to said first and second carrier sources and each including a plurality of individual digital-to-analog circuits responsive to said stored codes in a corresponding one of said memory positions in said first series of said digital codes for said first conversion means and in said second series of digital codes for said second conversion means; summing means responsive to the outputs of said conversion circuits for producing a plurality of summed analog signals, one such summed signal for each of said range increments of interest; means responsive to said summed signals for producing a triphase signal corresponding to each of said summed signals, each of said triphase signals thereby corresponding to a discreet Doppler frequency; a weighting matrix including fixed impedance elements for individually weighting at least two of the three components of each of said triphase signals, each of said triphase signals feeding a plurality of groups of said impedance elements each consisting of a single phase signal which is the weighted sum of triphase signals from all of said triphase circuits in corresponding groups of said weighted outputs for producing a final output as a predetermined function of individual amplitude of said weighted outputs.

2. The invention set forth in claim 1 in which said means for producing a triphase signal comprises phase shifter circuits for converting each of said summed signals into three signals each substantially 120° apart in phase, said three signals each constituting one of said triphase signals.

3. The invention set forth in claim 1 further defined in that said weighting matrix comprises a plurality of said impedance groups arranged in rows and columns, each of said columns receives a three conductor input from a corresponding one of said triphase circuits, each of said rows feeds a single conductor which constitutes one of said weighted outputs, and each of said impedance groups comprises a pair of two terminal impedances, said two terminal impedances in any one row being connected together at one terminal to said weighted output signal conductor and each of said two terminal impedances being connected to a different phase of said corresponding triphase signal, the same combination of phases to said impedances being used in each third of the said impedance groups in any of said rows and in each third of the said impedances in any of said columns.

4. The invention set forth in claim 3 further defined in that said two terminal impedances are resistors.

5. The invention set forth in claim 1 in which an isolating amplifier is inserted between each of said weighted outputs and said means for producing a final output.

6. The invention set forth in claim 1 in which said means responsive to said weighted outputs for producing a final output is an amplitude selective circuit for passing only the maximum signal corresponding to any given one of said weighted outputs.

7. The invention set forth in claim 1 further defined in that said first and second storage means each include a plurality of digital registers, one such register to said first memory position in each of said storage means and one to each successive memory position, thereby to facilitate the presentation of each stored code as said codes are moved to said successive memory positions, said first and second digital-to-analog conversion means being connected to receive said codes from said registers.

No references cited.

RODNEY D. BENNETT, *Primary Examiner.*

C. L. WHITHAM, *Assistant Examiner.*